United States Patent
Nagasawa et al.

(10) Patent No.: US 10,450,418 B2
(45) Date of Patent: Oct. 22, 2019

(54) POLYMERIZABLE COMPOSITION COMPRISING REACTIVE SILSESQUIOXANE COMPOUND AND AROMATIC VINYL COMPOUND

(71) Applicant: NISSAN CHEMICAL INDUSTRIES, LTD., Tokyo (JP)

(72) Inventors: Takehiro Nagasawa, Funabashi (JP); Taku Kato, Funabashi (JP); Kentaro Ohmori, Funabashi (JP); Keisuke Shuto, Funabashi (JP); Kenji Takase, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 38 days.

(21) Appl. No.: 15/753,689

(22) PCT Filed: Aug. 12, 2016

(86) PCT No.: PCT/JP2016/073757
§ 371 (c)(1),
(2) Date: Feb. 20, 2018

(87) PCT Pub. No.: WO2017/030090
PCT Pub. Date: Feb. 23, 2017

(65) Prior Publication Data
US 2019/0292324 A1 Sep. 26, 2019

(30) Foreign Application Priority Data

Aug. 18, 2015 (JP) ................................ 2015-161077
Apr. 11, 2016 (JP) ................................ 2016-079066

(51) Int. Cl.
| | |
|---|---|
| C08F 220/30 | (2006.01) |
| C08F 230/08 | (2006.01) |
| C08F 212/36 | (2006.01) |
| C08G 77/442 | (2006.01) |
| B29D 11/00 | (2006.01) |
| G02B 1/04 | (2006.01) |
| B29K 83/00 | (2006.01) |
| C08G 77/00 | (2006.01) |

(52) U.S. Cl.
CPC ...... *C08G 77/442* (2013.01); *B29D 11/00442* (2013.01); *C08F 220/30* (2013.01); *G02B 1/041* (2013.01); *B29K 2083/00* (2013.01); *C08G 77/70* (2013.01); *C08G 77/80* (2013.01); *C08J 2333/14* (2013.01); *C08J 2343/04* (2013.01)

(58) Field of Classification Search
CPC ...................................................... C08F 230/08
See application file for complete search history.

(56) References Cited

U.S. PATENT DOCUMENTS

2011/0230584 A1* 9/2011 Araki ................. C08F 290/148
522/99

FOREIGN PATENT DOCUMENTS

| | | |
|---|---|---|
| JP | H09-31136 A | 2/1997 |
| JP | 2008-297490 A | 12/2008 |
| JP | 2011-006610 A | 1/2011 |
| JP | 2011-052065 A | 3/2011 |
| JP | 2012-062398 A | 3/2012 |
| JP | 2012-180462 A | 9/2012 |
| JP | 2013-129766 A | 7/2013 |
| WO | 2009/078336 A1 | 6/2009 |
| WO | 2015/020482 A1 | 2/2015 |
| WO | 2015/129818 A1 | 9/2015 |
| WO | 2016/163561 A1 | 10/2016 |

OTHER PUBLICATIONS

Jun. 7, 2018 Office Action issued in European Patent Application No. 16837080.7.
May 28, 2018 Supplementary European Search Report issued in Patent Application No. 16837080.7.
Nov. 15, 2016 Written Opinion of the International Searching Authority issued in Patent Application No. PCT/JP2016/073757.
Nov. 15, 2016 International Search Report issued in Patent Application No. PCT/JP2016/073757.

\* cited by examiner

*Primary Examiner* — Marc S Zimmer
(74) *Attorney, Agent, or Firm* — Oliff PLC

(57) ABSTRACT

A polymerizable composition suitable for producing a molded article that can maintain a high refractive index and a low Abbe's number and can be restrained from dimensional changes due to a high-temperature thermal history has (a) 100 parts by mass of a specific reactive silsesquioxane compound, (b) 10 to 500 parts by mass of a specific fluorene compound and (c) 1 to 100 parts by mass of a specific aromatic vinyl compound. A cured product can be obtained by curing the polymerizable composition.

13 Claims, 1 Drawing Sheet

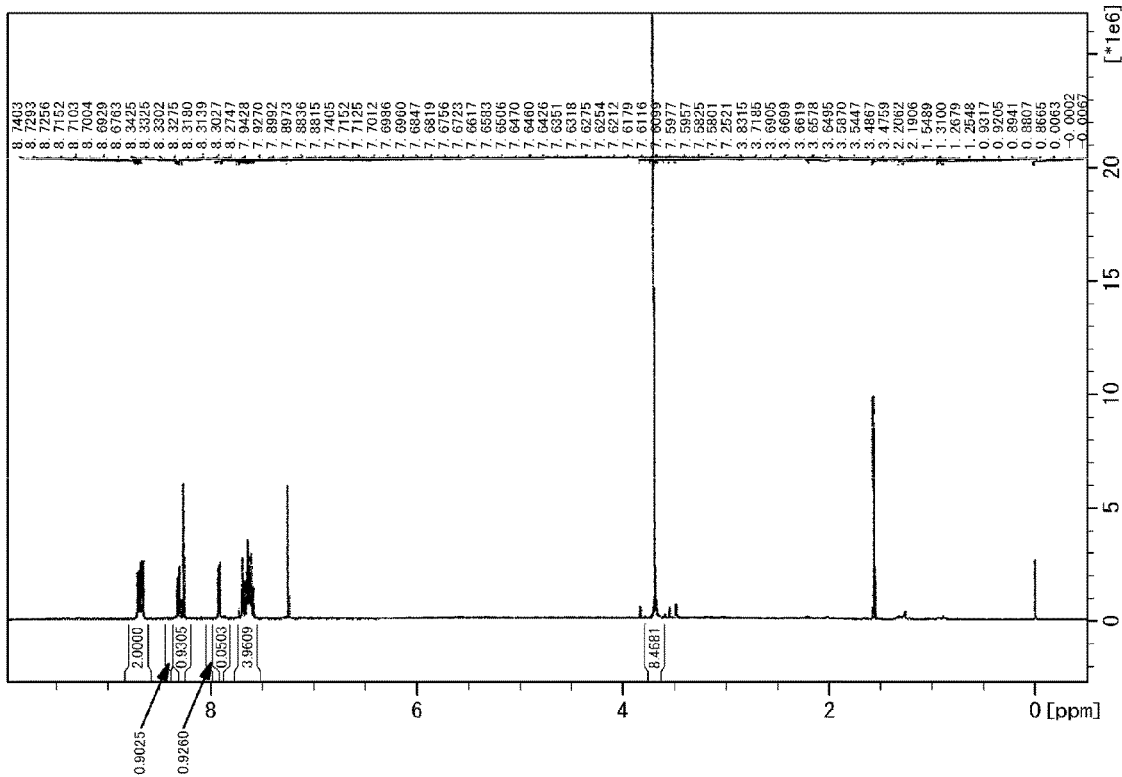

POLYMERIZABLE COMPOSITION COMPRISING REACTIVE SILSESQUIOXANE COMPOUND AND AROMATIC VINYL COMPOUND

TECHNICAL FIELD

The present invention relates to a polymerizable composition comprising a reactive silsesquioxane compound and an aromatic vinyl compound. Specifically, the present invention relates to a polymerizable composition that can form a cured product having excellent optical characteristics (high refractive index and low Abbe's number) and high heat resistance (crack resistance, dimensional stability, and the like).

BACKGROUND ART

Plastic lenses are used for mobile phones, digital cameras, vehicle-mounted cameras, and the like, and are required to have excellent optical characteristics suitable for the purpose of the device. Plastic lenses are also required to have high durability including, for example, heat resistance and weather resistance, and high productivity that allows them to be molded at good yield, according to the form of use. Transparent resins such as polycarbonate resins, cycloolefin polymers, and methacrylic resins, for example, have been used as resin materials for the plastic lens.

In recent years, in order to achieve a reduction in mounting costs, methods for mounting camera modules collectively by solder reflow have been proposed, and plastic lens materials for use in these methods have been demanded to be able to withstand a high-temperature thermal history (for example, 260° C.) in the solder reflow process. However, conventional plastic lenses, which are produced by injection-molding thermoplastic resins, have low heat resistance, and are difficult to adapt to the reflow process satisfactorily. Thus, the molding process for molding lenses for reflow mounting is shifting toward press molding that uses curable resins liquid at room temperature.

Meanwhile, a plurality of lenses are used for a high-resolution camera module, in which one of the lenses is required to be an optical material with a high refractive index and a low Abbe's number that serves as a wavelength correction lens. In particular, there has recently been an increasing demand for thinner camera modules, which has required a lens material having a high refractive index (for example, 1.62 or more) and a low Abbe's number (for example, 26 or less).

As disclosed in Patent Document 1, however, most of the conventional materials proposed as materials featuring high refractive index only have improved heat resistance to temperatures not higher than 200° C., and have failed to ensure heat resistance to withstand the solder reflow process at 260° C., for example.

Meanwhile, since satisfactory reflow heat resistance cannot be readily achieved by using organic materials alone, materials provided with heat resistance by mixing organic materials with inorganic particles such as silica have been proposed (see Patent Document 2, for example). In these materials, however, the silica content needs to be increased to achieve satisfactory heat resistance, which has the drawback of precluding an increase in the refractive index of the composition. Moreover, these materials are poor in reliability, because they may have decreased transparency due to the aggregation of the inorganic particles, or may result in brittleness in cured products due to the addition of the particles.

PRIOR ART DOCUMENTS

Patent Documents

Patent Document 1: Japanese Patent Application Publication No. H09-31136 (JP H09-31136 A)
Patent Document 2: Japanese Patent Application Publication No. 2012-62398 (JP 2012-62398 A)

SUMMARY OF THE INVENTION

Problem to be Solved by the Invention

As described above, there has been no curable resin material that has a high refractive index (for example, 1.62 or more) and a low Abbe's number (for example, 26 or less) to be usable as a high-resolution thin camera module lens, and achieves satisfactory heat resistance including, for example, dimensional stability to temperature changes, to be adaptable to a mounting process such as solder reflow. Hence, the development of such a curable resin material has been desired.

The present invention has been made in view of such circumstances, and an object of the present invention is to provide a polymerizable composition that forms a cured product that can maintain a high refractive index and a low Abbe's number, and is suitable for producing a molded article that can be restrained from dimensional changes due to a high-temperature thermal history.

Means for Solving the Problem

As a result of extensive research to solve the above-described problem, the present inventors have found that a polymerizable composition containing a specific reactive silsesquioxane compound, a specific fluorene compound, and a specific vinyl compound can provide a cured product (molded article) that exhibits a high refractive index (for example, 1.62 or more) and a low Abbe's number (for example, 26 or less), as well as a molded article that can be restrained from dimensional changes due to a high-temperature thermal history, thereby completing the present invention.

In summary, a first aspect of the present invention relates to a polymerizable composition comprising:

(a) 100 parts by mass of a reactive silsesquioxane compound, which is a polycondensate of an alkoxy silicon compound A of formula [1] and an alkoxy silicon compound B of formula [2]:

$$Ar^1—Si(OR^1)_3 \quad [1]$$

(wherein $Ar^1$ is a phenyl group having at least one group with a polymerizable double bond, a naphthyl group having at least one group with a polymerizable double bond, or a biphenyl group having at least one group with a polymerizable double bond; and $R^1$ is methyl group or ethyl group);

$$Ar^2—Si(OR^2)_3 \quad [2]$$

(wherein $Ar^2$ is a phenyl group optionally substituted with a $C_{1-6}$ alkyl group, a condensed polycyclic aromatic hydrocarbon group optionally substituted with a $C_{1-6}$ alkyl group, or a hydrocarbon ring assembly group (optionally substituted with a $C_{1-6}$ alkyl group) in which a plurality of aromatic rings are directly joined by a single bond; and $R^2$ is methyl group or ethyl group);

(b) 10 to 500 parts by mass of a fluorene compound of formula [3]:

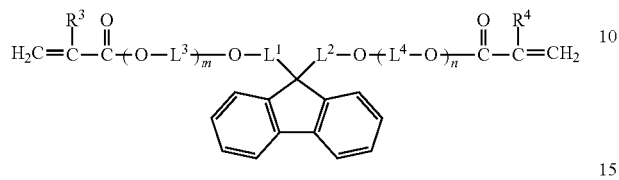

[3]

(wherein $R^3$ and $R^4$ are each independently a hydrogen atom or methyl group; $L^1$ and $L^2$ are each independently a phenylene group optionally having a substituent or a naphthalenediyl group optionally having a substituent; $L^3$ and $L^4$ are each independently a $C_{1-6}$ alkylene group; and m and n are each zero or a positive integer such that m+n is 0 to 40); and (c) 1 to 100 parts by mass of an aromatic vinyl compound of formula [4]:

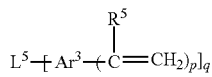

[4]

(wherein $R^5$ is a hydrogen atom or methyl group; $L^5$ is a single bond, a hydrogen atom, an oxygen atom, a $C_{1-20}$ aliphatic hydrocarbon residue having a valence of q optionally substituted with phenyl group, or a $C_{1-20}$ aliphatic hydrocarbon residue having a valence of q optionally containing an ether bond; $Ar^3$ is an aromatic hydrocarbon residue having a valence of p+1; p's are each independently 1 or 2; and q is an integer from 1 to 3 (with the proviso that q is 1 when $L^5$ is a hydrogen atom, and q is 2 when $L^5$ is a single bond or an oxygen atom)).

A second aspect of the present invention relates to the polymerizable composition according to the first aspect, wherein $Ar^2$ is a condensed polycyclic aromatic hydrocarbon group optionally substituted with a $C_{1-6}$ alkyl group or a hydrocarbon ring assembly group (optionally substituted with a $C_{1-6}$ alkyl group) in which a plurality of aromatic rings are directly joined by a single bond.

A third aspect of the present invention relates to the polymerizable composition according to the first or second aspect, wherein the reactive silsesquioxane compound (a) is a polycondensate of a compound of formula [1a] and at least one compound selected from the group consisting of compounds of formulas [2a], [2b], and [2c]:

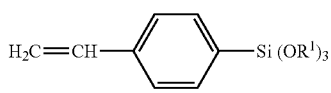

[1a]

(wherein $R^1$ has the same meaning as defined above);

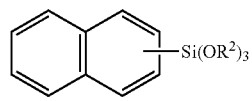

[2a]

(wherein $R^2$ has the same meaning as defined above);

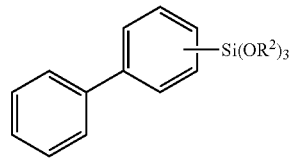

[2b]

(wherein $R^2$ has the same meaning as defined above);

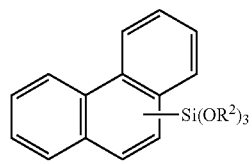

[2c]

(wherein $R^2$ has the same meaning as defined above).

A fourth aspect of the present invention relates to the polymerizable composition according to any one of the first to third aspects, wherein $L^5$ is a hydrogen atom, q is 1, and p is 2.

A fifth aspect of the present invention relates to the polymerizable composition according to any one of the first to fourth aspects, wherein a cured product obtained from the composition has a refractive index of 1.62 or more and an Abbe's number of 26 or less.

A sixth aspect of the present invention relates to a cured product obtained by curing the polymerizable composition according to any one of the first to fifth aspects.

A seventh aspect of the present invention relates to a high-refractive-index resin lens material comprising the polymerizable composition according to any one of the first to fifth aspects.

An eighth aspect of the present invention relates to a resin lens produced using the polymerizable composition according to any one of the first to fifth aspects.

A ninth aspect of the present invention relates to a method for producing a molded article comprising the steps of:

charging the polymerizable composition according to any one of the first to fifth aspects into a space between a support and a mold that are in contact with each other or an inside space of a dividable mold; and photopolymerizing the charged composition by exposure.

A tenth aspect of the present invention relates to the method for producing a molded article according to the ninth aspect, further comprising the steps of:

releasing the resulting photopolymerization product from the charged space; and heating the photopolymerization product before, during, or after the release.

An eleventh aspect of the present invention relates to the method for producing a molded article according to the ninth or tenth aspect, wherein the molded article is a camera module lens.

A twelfth aspect of the present invention relates to a method for producing a reactive silsesquioxane compound characterized in that an alkoxy silicon compound A of formula [1] is polycondensed with an alkoxy silicon compound B of formula [2] in the presence of a base, and then the base is removed using a cation-exchange resin:

  [1]

(wherein $Ar^1$ is a phenyl group having at least one group with a polymerizable double bond, a naphthyl group having at least one group with a polymerizable double bond, or a biphenyl group having at least one group with a polymerizable double bond; and $R^1$ is methyl group or ethyl group);

  [2]

(wherein $Ar^2$ is a phenyl group optionally substituted with a $C_{1-6}$ alkyl group, a condensed polycyclic aromatic hydrocarbon group optionally substituted with a $C_{1-6}$ alkyl group, or a hydrocarbon ring assembly group (optionally substituted with a $C_{1-6}$ alkyl group) in which a plurality of aromatic rings are directly joined by a single bond; and $R^2$ is methyl group or ethyl group).

A thirteenth aspect of the present invention relates to the method for producing a reactive silsesquioxane compound according to the twelfth aspect, wherein the cation-exchange resin is an ion-exchange resin having sulfo group as an ionic group.

Effects of the Invention

The cured product obtained from the polymerizable composition of the present invention has not only optical characteristics (high refractive index and low Abbe's number) desirable in a lens for an optical device such as a high-resolution camera module, but also heat resistance (crack resistance, dimensional stability, and the like) to be adaptable to a mounting process for a high-resolution camera module.

Thus, the high-refractive-index resin lens material of the present invention composed of the above-described polymerizable composition can be suitably used as a high-resolution camera module lens.

Moreover, according to the method of the present invention, a molded article, particularly a camera module lens can be efficiently produced.

Furthermore, the polymerizable composition of the present invention has such a viscosity that it can be adequately handled without solvent. Thus, a molded article can be suitably molded therefrom by applying press processing against a mold such as a die (imprint technology). The polymerizable composition of the present invention also has excellent release properties from the mold.

BRIEF DESCRIPTION OF THE DRAWING

FIG. 1 is a plot showing the $^1$H NMR spectrum of trimethoxy(9-phenanthryl)silane obtained in Production Example 3.

MODES FOR CARRYING OUT THE INVENTION

<<Polymerizable Composition>>

The polymerizable composition of the present invention is a polymerizable composition comprising a specific reactive silsesquioxane compound as a component (a), a specific fluorene compound as a component (b), and a specific aromatic vinyl compound as a component (c).

Each of the components will be hereinafter described in detail.

<(a) Reactive Silsesquioxane Compound>

The reactive silsesquioxane compound (a) used in the present invention is a compound obtained by polycondensation of an alkoxy silicon compound A having a specific structure and an alkoxy silicon compound B having a specific structure described below, in the presence of an acid or a base.

[Alkoxy Silicon Compound A]

The alkoxy silicon compound A is a compound of formula [1]:

  [1]

wherein $Ar^1$ is a phenyl group having at least one group with a polymerizable double bond, a naphthyl group having at least one group with a polymerizable double bond, or a biphenyl group having at least one group with a polymerizable double bond; and $R^1$ is methyl group or ethyl group.

Examples of the phenyl group having at least one group with a polymerizable double bond of $Ar^1$ include 2-vinylphenyl group, 3-vinylphenyl group, 4-vinylphenyl group, 4-vinyloxyphenyl group, 4-allylphenyl group, 4-allyloxyphenyl group, and 4-isopropenylphenyl group.

Examples of the naphthyl group having at least one group with a polymerizable double bond of $Ar^1$ include 4-vinylnaphthalen-1-yl group, 5-vinylnaphthalen-1-yl group, 6-vinylnaphthalen-2-yl group, 4-allyloxynaphthalen-1-yl group, 5-allyloxynaphthalen-1-yl group, 8-allyloxynaphthalen-1-yl group, 5-vinyloxynaphthalen-1-yl group, 5-allylnaphthalen-1-yl group, and 5-isopropenylnaphthalen-1-yl group.

Examples of the biphenyl group having at least one group with a polymerizable double bond of $Ar^1$ include 4'-vinyl-[1,1'-biphenyl]-2-yl group, 4'-vinyl-[1,1'-biphenyl]-3-yl group, 4'-vinyl-[1,1'-biphenyl]-4-yl group, 4'-vinyloxy-[1,1'-biphenyl]-4-yl group, 4'-allyl-[1,1'-biphenyl]-4-yl group, 4'-allyloxy-[1,1'-biphenyl]-4-yl group, and 4'-isopropenyl-[1,1'-biphenyl]-4-yl group.

Specific examples of the compound of formula [1] include, although not limited to, trimethoxy(4-vinylphenyl)silane, triethoxy(4-vinylphenyl)silane, (4-isopropenylphenyl)trimethoxysilane, trimethoxy(4-vinyl-1-naphthyl)silane, and trimethoxy(4'-vinyl-[1,1'-biphenyl]-4-yl)silane.

[Alkoxy Silicon Compound B]

The alkoxy silicon compound B is a compound of formula [2]:

  [2]

wherein $Ar^2$ is a phenyl group optionally substituted with a $C_{1-6}$ alkyl group, a condensed polycyclic aromatic hydrocarbon group optionally substituted with a $C_{1-6}$ alkyl group, or a hydrocarbon ring assembly group (optionally substituted with a $C_{1-6}$ alkyl group) in which a plurality of aromatic rings are directly joined by a single bond; and $R^2$ is methyl group or ethyl group.

Examples of the phenyl group optionally substituted with a $C_{1-6}$ alkyl group of $Ar^2$ include phenyl group, o-tolyl group, m-tolyl group, p-tolyl group, 2,4,6-trimethylphenyl group, and 4-tert-butylphenyl group.

Examples of the condensed polycyclic aromatic hydrocarbon group of $Ar^2$ include monovalent groups derived from naphthalene, phenanthrene, anthracene, triphenylene, pyrene, chrysene, naphthacene, biphenylene, and fluorene.

Examples of the hydrocarbon ring assembly group in which a plurality of aromatic rings are directly joined by a single bond include monovalent groups derived from biphenyl, terphenyl, quaterphenyl, binaphthalene, phenylnaphthalene, phenylfluorene, and diphenylfluorene.

Examples of the $C_{1-6}$ alkyl group that the condensed polycyclic aromatic hydrocarbon group and the hydrocarbon ring assembly group may have as a substituent include methyl group, ethyl group, n-propyl group, isopropyl group, n-butyl group, isobutyl group, sec-butyl group, tert-butyl group, n-pentyl group, cyclopentyl group, n-hexyl group, and cyclohexyl group.

Among the above-mentioned examples, $Ar^2$ is preferably a condensed polycyclic aromatic hydrocarbon group optionally substituted with a $C_{1-6}$ alkyl group or a hydrocarbon ring assembly group (optionally substituted with a $C_{1-6}$ alkyl group) in which a plurality of aromatic rings are directly joined by a single bond.

Specific examples of the compound of formula [2] include, although not limited to, trimethoxy(phenyl)silane, triethoxy(phenyl)silane, trimethoxy(p-tolyl)silane, trimethoxy(1-naphthyl)silane, triethoxy(1-naphthyl)silane, trimethoxy(2-naphthyl)silane, triethoxy(2-naphthyl)silane, trimethoxy(2-phenanthryl)silane, trimethoxy(3-phenanthryl)silane, trimethoxy(9-phenanthryl)silane, triethoxy(9-phenanthryl)silane, [1,1'-biphenyl]-4-yltrimethoxysilane, and [1,1'-biphenyl]-4-yltriethoxysilane.

Among the above-mentioned examples, the reactive silsesquioxane compound as the component (a) is preferably a reactive silsesquioxane compound obtained by polycondensation of a compound of formula [1a] and at least one compound selected from the group consisting of compounds of formulas [2a], [2b], and [2c], in the presence of an acid or a base:

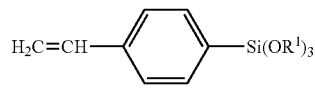

[1a]

wherein $R^1$ has the same meaning as defined above;

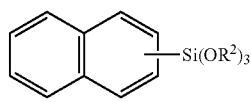

[2a]

wherein $R^2$ has the same meaning as defined above;

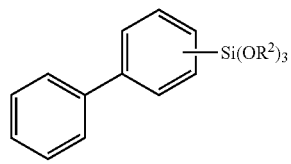

[2b]

wherein $R^2$ has the same meaning as defined above;

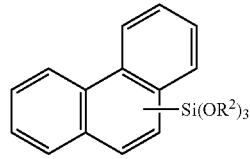

[2c]

wherein $R^2$ has the same meaning as defined above.

[Proportions of Alkoxy Silicon Compound A and Alkoxy Silicon Compound B to be Used]

The molar ratio to be used for the polycondensation reaction of the alkoxy silicon compound A of formula [1] and the alkoxy silicon compound B of formula [2] for producing the reactive silsesquioxane compound as the component (a) is not particularly limited; typically, the molar ratio is preferably in the range where the alkoxy silicon compound A:the alkoxy silicon compound B=5:1 to 1:5, in order to stabilize the physical properties of the cured product. More preferably, the molar ratio is in the range between 3:1 to 1:3. When the ratio of the number of moles of the alkoxy silicon compound A to the number of moles of the alkoxy silicon compound B is 5 or less, a cured product having a higher refractive index and a lower Abbe's number can be obtained. Furthermore, when the ratio of the number of moles of the alkoxy silicon compound A to the number of moles of the alkoxy silicon compound B is 1/5 or more, a sufficient cross-link density can be achieved, and the dimensional stability to heat can be further improved.

Suitable compounds may be selected as required, for use as the alkoxy silicon compounds A and B, or a plurality of compounds may be used in combination for use as each of the alkoxy silicon compounds A and B. In this case also, the ratio of the total molar amount of the alkoxy silicon compound A to the total molar amount of the alkoxy silicon compound B falls within the above-defined range.

[Acidic or Basic Catalyst]

The polycondensation reaction between the alkoxy silicon compound A of formula [1] and the alkoxy silicon compound B of formula [2] is suitably performed in the presence of an acidic or basic catalyst.

The catalyst to be used for the polycondensation reaction is not particularly limited in type as long as it dissolves or is homogeneously dispersed in the below-described solvent. The catalyst to be used may be selected as appropriate.

Examples of usable catalysts include acidic compounds including inorganic acids such as hydrochloric acid, nitric acid, and sulfuric acid, and organic acids such as acetic acid and oxalic acid; basic compounds such as alkali metal hydroxides, alkaline earth metal hydroxides, ammonium hydroxide, quaternary ammonium salts, and amines; and fluoride salts such as $NH_4F$ and $NR_4F$, wherein R is at least one selected from the group consisting of a hydrogen atom, a linear alkyl group having a carbon atom number of 1 to 12, a branched alkyl group having a carbon atom number of 3 to 12, and a cyclic alkyl group having a carbon atom number of 3 to 12.

These catalysts may be used alone or in combination of two or more.

Examples of the acidic compounds include hydrochloric acid, nitric acid, sulfuric acid, acetic acid, oxalic acid, and boric acid.

Examples of the basic compounds include sodium hydroxide, potassium hydroxide, magnesium hydroxide, calcium hydroxide, strontium hydroxide, barium hydroxide, ammonium hydroxide, tetramethylammonium hydroxide, tetraethylammonium hydroxide, tetrabutylammonium hydroxide, and triethylamine.

Examples of the fluoride salts include ammonium fluoride, tetramethylammonium fluoride, and tetrabutylammonium fluoride.

Among these catalysts, one or more selected from the group consisting of hydrochloric acid, acetic acid, potassium hydroxide, calcium hydroxide, barium hydroxide, and tetraethylammonium hydroxide are preferably used.

The amount of the catalyst to be used is 0.01 to 10% by mass, and preferably 0.1 to 5% by mass, based on the total mass of the alkoxy silicon compounds A and B. When the amount of the catalyst used is 0.01% by mass or more, the reaction proceeds more satisfactorily. In consideration of economy, a sufficient amount of the catalyst to be used is 10% by mass or less.

[Polycondensation Reaction]

One feature of the reactive silsesquioxane compound according to the present invention is the structure of the alkoxy silicon compound A. The reactive groups (polymerizable double bonds) contained in the alkoxy silicon compound A used in the present invention are readily polymerized by radicals or cations, and exhibit high heat resistance after polymerization (after curing).

The hydrolytic polycondensation reaction between the alkoxy silicon compounds A and B can be performed without solvent; however, a solvent inert to both the alkoxy silicon compounds such as tetrahydrofuran (THF) as described below can be used as a reaction solvent. The use of such a reaction solvent has the advantage of readily making the reaction system homogeneous, and allowing the polycondensation reaction to be performed more stably.

As described above, although the synthesis reaction of the reactive silsesquioxane compound can be performed without solvent, a solvent may also be used to make the reaction more homogeneous. The solvent is not particularly limited as long as it is unreactive with both the alkoxy silicon compounds, and dissolves the polycondensate.

Examples of such reaction solvents include ketones such as acetone and methyl ethyl ketone (MEK); aromatic hydrocarbons such as benzene, toluene, and xylene; ethers such as tetrahydrofuran (THF), 1,4-dioxane, diisopropyl ether, and cyclopentyl methyl ether (CPME); glycols such as ethylene glycol, propylene glycol, and hexylene glycol; glycol ethers such as ethyl cellosolve, butyl cellosolve, ethyl carbitol, butyl carbitol, diethyl cellosolve, and diethyl carbitol; and amides such as N-methyl-2-pyrrolidone (NMP) and N,N-dimethylformamide (DMF). These solvents may be used alone or as a mixture of two or more.

The reactive silsesquioxane compound used in the present invention is obtained by hydrolytic polycondensation of the alkoxy silicon compound A of formula [1] and the alkoxy silicon compound B of formula [2], in the presence of an acidic or basic catalyst. The reaction temperature to be used in the hydrolytic polycondensation is 20 to 150° C., and preferably 30 to 120° C.

The reaction time is not particularly limited as long as it is not shorter than a time that is required to terminate an increase in the molecular weight of the polycondensate, and stabilize the molecular weight distribution. More specifically, the reaction time is from several hours to several days.

After the completion of the polycondensation reaction, it is preferred that the obtained reactive silsesquioxane compound be collected using any method such as filtration or solvent distillation, and then be subjected to a suitable purification process, as required.

The present invention also provides a method for producing a reactive silsesquioxane compound comprising polycondensing an alkoxy silicon compound A of formula [1] with an alkoxy silicon compound B of formula [2] in the presence of a base, and then removing the base using a cation-exchange resin.

With regard to the base and the amount of the base to be used, one or more compounds selected from the group consisting of the above-mentioned basic compounds and fluoride salts can be used as the base in the same amount as mentioned above. Preferably, one or more selected from the group consisting of potassium hydroxide, calcium hydroxide, barium hydroxide, and tetraethylammonium hydroxide can be used as the base.

Furthermore, with regard to the reaction conditions, the reaction solvent, and the like to be used for the polycondensation reaction, those mentioned above can be used.

After the completion of the reaction, an ion-exchange resin having sulfo group as an ionic group can be preferably used as the cation-exchange resin to be used for removing the base.

As the cation-exchange resin, one having a commonly used base structure such as a styrene-based (styrene-divinylbenzene copolymer) or acrylic-based cation-exchange resin can be used. Moreover, either a strongly acidic ion-exchange resin having sulfo group as an ionic group or a weakly acidic cation-exchange resin having carboxy group as an ionic group may be used. Furthermore, cation-exchange resins in various forms such as particles, fibers, or membranes can be used. Commercially available products of these cation-exchange resins can be suitably used.

Among the above-mentioned examples, a strongly acidic ion-exchange resin having sulfo group as an ionic group is preferably used.

Examples of commercially available strongly acidic cation-exchange resins include Amberlite (registered trademark) 15, 200, 200C, 200CT, 252, 1200H, IR120B, IR120H, IR122Na, IR124, IRC50, IRC86, IRN77, IRP-64, IRP-69, CG-50 and CG-120, Amberjet (registered trademark) 1020, 1024, 1060, 1200 and 1220, Amberlyst (registered trademark) 15, 15DRY, 15JWET, 16, 16WET, 31WET, 35WET and 36; Dowex (registered trademark) 50Wx2, 50Wx4, 50Wx8, DR-2030, DR-G8, HCR-W2, 650C UPW, G-26, 88, M-31 and N-406, Dowex (registered trademark) Monosphere (registered trademark) 650C, 88, M-31, 99K/320, 99K/350 and 99Ca/320, and Dowex Marathon (registered trademark) MSC and C [all from Dow Chemical Company]; Diaion (registered trademark) EXC04, HPK25, PK208, PK212, PK216, PK220, PK228L, RCP160M, SK1B, SK1BS, SK104, SK110, SK112, SK116, UBK510L and UBK555 [all from Mitsubishi Chemical Corporation]; and Lewatit (registered trademark) MonoPlusS100 and MonoPlusSP112 [both from LANXESS Corporation].

Examples of commercially available weakly acidic cation-exchange resins include Amberlite (registered trademark) CG-50, FPC3500, IRC50, IRC76, IRC86 and IRP-64, and Dowex (registered trademark) MAC-3 [all from Dow Chemical Company]; and Diaion (registered trademark) CWK30/S, WK10, WK11, WK40, WK100 and WT01S [all from Mitsubishi Chemical Corporation].

The polycondensate obtained by this reaction has a weight average molecular weight Mw of 500 to 100,000, preferably 500 to 30,000, as measured by GPC relative to polystyrene, and has a degree of distribution Mw (weight average molecular weight)/Mn (number average molecular weight) of 1.0 to 10.

The reactive silsesquioxane compound (a) is a compound with a cross-linked structure having at least siloxane units of [Ar$^1$SiO$_{3/2}$] and [Ar$^2$SiO$_{3/2}$].

<(b) Fluorene Compound>

The fluorene compound (b) used in the present invention is a compound of formula [3]:

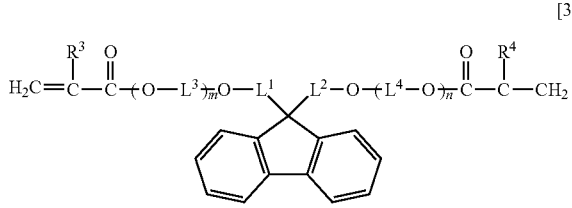

[3]

wherein R$^3$ and R$^4$ are each independently a hydrogen atom or methyl group; L$^1$ and L$^2$ are each independently a phenylene group optionally having a substituent or a naphthalenediyl group optionally having a substituent; L$^3$ and L$^4$ are each independently a C$_{1-6}$ alkylene group; and m and n are each zero or a positive integer such that m+n is 0 to 40.

Examples of the phenylene group optionally having a substituent of L$^1$ and L$^2$ include o-phenylene group, m-phenylene group, p-phenylene group, 2-methylbenzene-1,4-diyl group, 2-aminobenzene-1,4-diyl group, 2,4-dibromobenzene-1,3-diyl group, and 2,6-dibromobenzene-1,4-diyl group.

Examples of the naphthalenediyl group optionally having a substituent of L$^1$ and L$^2$ include 1,2-naphthalenediyl group, 1,4-naphthalenediyl group, 1,5-naphthalenediyl group, 1,8-naphthalenediyl group, 2,3-naphthalenediyl group, and 2,6-naphthalenediyl group.

Examples of the C$_{1-6}$ alkylene group of L$^3$ and L$^4$ include methylene group, ethylene group, trimethylene group, 1-methyl ethylene group, tetramethylene group, 1-methyltrimethylene group, 1,1-dimethylethylene group, pentamethylene group, 1-methyltetramethylene group, 2-methyltetramethylene group, 1,1-dimethyltrimethylene group, 1,2-dimethyltrimethylene group, 2,2-dimethyltrimethylene group, 1-ethyltrimethylene group, hexamethylene group, 1-methylpentamethylene group, 2-methylpentamethylene group, 3-methylpentamethylene group, 1,1-dimethyltetramethylene group, 1,2-dimethyltetramethylene group, 2,2-dimethyltetramethylene group, 1-ethyltetramethylene group, 1,1,2-trimethyltrimethylene group, 1,2,2-trimethyltrimethylene group, 1-ethyl-1-methyltrimethylene group, and 1-ethyl-2-methyltrimethylene group.

In the compound of formula [3], m and n preferably satisfy the condition where m+n is 0 to 30, and more preferably satisfy the condition where m+n is 2 to 20.

Specific examples of the compound of formula [3] include, although not limited to, 9,9-bis(4-(2-(meth)acryloyloxyethoxy)phenyl)-9H-fluorene, OGSOL (registered trademark) EA-0200, EA-0300, EA-F5003, EA-F5503, EA-F5510, EA-F5710 and GA-5000 [all from Osaka Gas Chemicals Co., Ltd.], and NK ester A-BPEF [from Shin Nakamura Chemical Co., Ltd.].

In the polymerizable composition of the present invention, the amount of the component (b) is 10 to 500 parts by mass, and particularly preferably 30 to 250 parts by mass, based on 100 parts by mass of the component (a).

<(c) Aromatic Vinyl Compound>

The aromatic vinyl compound (c) used in the present invention is a compound of formula [4]:

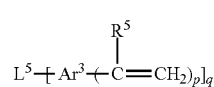

[4]

wherein R$^5$ is a hydrogen atom or methyl group; L$^5$ is a single bond, a hydrogen atom, an oxygen atom, a C$_{1-20}$ aliphatic hydrocarbon residue having a valence of q optionally substituted with phenyl group, or a C$_{1-20}$ aliphatic hydrocarbon residue having a valence of q optionally containing an ether bond; Ar$^3$ is an aromatic hydrocarbon residue having a valence of p+1; p's are each independently 1 or 2; and q is an integer from 1 to 3 (with the proviso that q is 1 when L$^5$ is a hydrogen atom, and q is 2 when L$^5$ is a single bond or an oxygen atom).

Examples of the C$_{1-20}$ aliphatic hydrocarbon in the C$_{1-20}$ aliphatic hydrocarbon residue having a valence of q optionally substituted with phenyl group or the C$_{1-20}$ aliphatic hydrocarbon residue having a valence of q optionally containing an ether bond of L$^5$ include linear alkanes such as methane, ethane, propane, n-butane, n-pentane, n-hexane, n-heptane, n-octane, n-nonane, n-decane, n-undecane, n-dodecane, n-tridecane, n-tetradecane, n-pentadecane, n-hexadecane, n-heptadecane, n-octadecane, n-nonadecane, and n-eicosane; branched alkanes such as 2-methylpropane and 2,2-dimethylpropane; and cyclic alkanes such as cyclopentane and cyclohexane. Examples of the C$_{1-20}$ aliphatic hydrocarbon residue having a valence of q include alkyl groups, alkanediyl groups, and alkanetriyl groups resulting from removal of one to three hydrogen atoms from the above-mentioned alkanes.

Examples of these residues of L$^5$ include methyl group, ethyl group, n-propyl group, isopropyl group, n-butyl group, n-hexyl group, cyclohexyl group, benzyl group, phenethyl group, methoxymethyl group, ethoxymethyl group, 2-methoxyethyl group, methylene group, ethylene group, trimethylene group, 1-methylethylene group, propane-2,2-diyl group, tetramethylene group, pentamethylene group, 2,2-dimethyltrimethylene group, hexamethylene group, 3-methylpentamethylene group, cyclohexane-1,4-diyl group, diethylene glycol residue (—CH$_2$CH$_2$OCH$_2$CH$_2$—), triethylene glycol residue (—(CH$_2$CH$_2$O)$_2$CH$_2$CH$_2$—), dipropylene glycol residue (—CH(CH$_3$)CH$_2$OCH(CH$_3$)CH$_2$—), oxytetramethyleneoxy group, propane-1,1,1-triyl group, propane-1,1,3-triyl group, butane-1,2,4-triyl group, and cyclohexane-1,3,5-triyl group.

Examples of the aromatic hydrocarbon residue having a valence of p+1 of Ar$^3$ include groups resulting from removal of p+1 hydrogen atoms from aromatic hydrocarbon rings such as benzene and naphthalene.

Among the compounds of formula [4], a compound in which L$^5$ is a hydrogen atom, q is 1, and p is 2 is preferred.

Specific examples of the compound of formula [4] include styrene, 1-phenethyl-4-vinylbenzene, 1-vinylnaphthalene, 2-vinylnaphthalene, divinylbenzene, diisopropenylbenzene, divinylnaphthalene, 4,4'-divinylbiphenyl, bis(4-vinylphenyl) ether, 1-vinyl-2-(4-vinylphenoxy)benzene, 2,2-bis(4-vinylphenyl)propane, and 1,1,1-tris(4-vinylphenoxy)propane.

Among the above, styrene, 1-vinylnaphthalene, divinylbenzene, and 2,2-bis(4-vinylphenyl)propane are preferred, and divinylbenzene is more preferred.

In the polymerizable composition of the present invention, the amount of the component (c) is 1 to 100 parts by mass, and particularly preferably 3 to 50 parts by mass, based on 100 parts by mass of the component (a).

<(d) Polymerization Initiator>

The polymerizable composition of the present invention may contain a polymerization initiator (d) in addition to the components (a) to (c). Either of a photopolymerization initiator and a thermal polymerization initiator can be used as the polymerization initiator.

Examples of the photopolymerization initiator include alkylphenones, benzophenones, acylphosphine oxides, Michler's benzoylbenzoates, oxime esters, tetramethylthiuram monosulfides, and thioxanthones.

In particular, a photocleavable photoradical polymerization initiator is preferred. Examples of the photocleavable photoradical polymerization initiator include those described in "Saishin UV Koka Gijutsu" ("Latest UV Curing Technology") (p. 159, publisher: Kazuhiro Takausu, published by TECHNICAL INFORMATION INSTITUTE CO., LTD, 1991).

Examples of commercially available photoradical polymerization initiators include IRGACURE (registered trademark) 184, 369, 651, 500, 819, 907, 784, 2959, CGI1700, CGI1750, CGI1850, CG24-61 and TPO, and Darocur (registered trademark) 1116 and 1173 [all from BASF Japan Ltd.], and ESACURE KIP150, KIP65LT, KIP100F, KT37, KT55, KTO46 and KIP75 [all from Lamberti].

Examples of the thermal polymerization initiator include azos and organic peroxides.

Examples of commercially available azo-based thermal polymerization initiators include V-30, V-40, V-59, V-60, V-65 and V-70 [all from Wako Pure Chemical Industries, Ltd.].

Examples of commercially available organic peroxide-based thermal polymerization initiators include, although not limited to, Perkadox (registered trademark) CH, BC-FF, 14 and 16, Trigonox (registered trademark) 22, 23 and 121, Kayaester (registered trademark) P and O, and Kayabutyl (registered trademark) B [all from Kayaku Akzo Corporation], and PERHEXA (registered trademark) HC, PERCUMYL (registered trademark) H, PEROCTA (registered trademark) O, PERHEXYL (registered trademark) O and Z, and PERBUTYL (registered trademark) O and Z (all from NOF Corporation).

When a polymerization initiator is added, a single polymerization initiator or a mixture of two or more polymerization initiators may be used. The amount of the polymerization initiator to be added is 0.1 to 20 parts by mass, and preferably 0.3 to 10 parts by mass, based on the total amount of the polymerizable components, i.e., 100 parts by mass of the components (a) to (c).

Furthermore, a preferred aspect of the present invention is a polymerizable composition wherein a cured product obtained therefrom has an Abbe's number of 26 or less, from the viewpoint of providing a high refractive index for the cured product obtained from the polymerizable composition.

<Other Additives>

The polymerizable composition of the present invention may also contain, as required, a chain transfer agent, an antioxidant, an ultraviolet absorber, a photostabilizer, a leveling agent, a rheology-controlling agent, an adhesion adjuvant such as a silane coupling agent, a pigment, a dye, a defoaming agent, and the like, without impairing the effects of the present invention. The polymerizable composition of the present invention may also contain other polymerizable compounds (for example, a mono(meth)acrylate compound having an aromatic group).

Examples of the chain transfer agent include:

thiol compounds including mercaptocarboxylic acid esters such as methyl mercaptoacetate, methyl 3-mercaptopropionate, 2-ethylhexyl 3-mercaptopropionate, 3-methoxybutyl 3-mercaptopropionate, n-octyl 3-mercaptopropionate, stearyl 3-mercaptopropionate, 1,4-bis(3-mercaptopropionyloxy)butane, 1,4-bis(3-mercaptobutyryloxy)butane, trimethylolethane tris(3-mercaptopropionate), trimethylolethane tris(3-mercaptobutyrate), trimethylolpropane tris(3-mercaptopropionate), trimethylolpropane tris(3-mercaptobutyrate), pentaerythritol tetrakis(3-mercaptopropionate), pentaerythritol tetrakis(3-mercaptobutyrate), dipentaerythritol hexakis(3-mercaptopropionate), dipentaerythritol hexakis(3-mercaptobutyrate), tris[2-(3-mercaptopropionyloxy)ethyl] isocyanurate, and tris[2-(3-mercaptobutyryloxy)ethyl] isocyanurate; alkylthiols such as ethanethiol, 2-methylpropane-2-thiol, n-dodecanethiol, 2,3,3,4,4,5-hexamethylhexane-2-thiol (tert-dodecanethiol), ethane-1,2-dithiol, propane-1,3-dithiol, and benzylthiol; aromatic thiols such as benzenethiol, 3-methylbenzenethiol, 4-methylbenzenethiol, naphthalene-2-thiol, pyridine-2-thiol, benzimidazole-2-thiol, and benzothiazole-2-thiol; mercaptoalcohols such as 2-mercaptoethanol and 4-mercapto-1-butanol; and silane-containing thiols such as 3-(trimethoxysilyl)propane-1-thiol and 3-(triethoxysilyl)propane-1-thiol;

disulfide compounds including alkyl disulfides such as diethyl disulfide, dipropyl disulfide, diisopropyl disulfide, dibutyl disulfide, di-tert-butyl disulfide, dipentyl disulfide, diisopentyl disulfide, dihexyl disulfide, dicyclohexyl disulfide, didecyl disulfide, bis(2,3,3,4,4,5-hexamethylhexan-2-yl) disulfide(di-tert-dodecyl disulfide), bis(2,2-diethoxyethyl) disulfide, bis(2-hydroxyethyl) disulfide, and dibenzyl disulfide; aromatic disulfides such as diphenyl disulfide, di-p-tolyl disulfide, di(pyridin-2-yl)pyridyl disulfide, di(benzimidazol-2-yl) disulfide, and di(benzothiazol-2-yl) disulfide; thiuram disulfides such as tetramethylthiuram disulfide, tetraethylthiuram disulfide, tetrabutylthiuram disulfide, and bis(pentamethylene)thiuram disulfide; and α-methyl styrene dimer.

When a chain transfer agent is added, a single chain transfer agent or a mixture of two or more chain transfer agents may be used. The amount of the chain transfer agent to be added is 0.01 to 20 parts by mass, and preferably 0.1 to 10 parts by mass, based on the total amount of the polymerizable components, i.e., 100 parts by mass of the components (a) to (c).

Examples of the antioxidant include phenolic antioxidants, phosphoric acid-based antioxidants, and sulfide-based antioxidants, with phenolic antioxidants being preferred.

Examples of phenolic antioxidants include IRGANOX (registered trademark) 245, 1010, 1035, 1076 and 1135 [all from BASF Japan Ltd.], SUMILIZER (registered trademark) GA-80, GP, MDP-S, BBM-S and WX-R [all from Sumitomo Chemical Co., Ltd.], and ADK STAB (registered trademark) AO-20, AO-30, AO-40, AO-50, AO-60, AO-80 and AO-330 [all from ADEKA Corporation].

When an antioxidant is added, a single antioxidant or a mixture of two or more antioxidants may be used. The amount of the antioxidant to be added is 0.01 to 20 parts by mass, and preferably 0.1 to 10 parts by mass, based on the total amount of the polymerizable components, i.e., 100 parts by mass of the components (a) to (c).

<Method for Preparing Polymerizable Composition>

The method for preparing the polymerizable composition according to an embodiment of the present invention is not particularly limited. Examples of the preparation method include a method in which the components (a) to (c) and optionally the component (d) are mixed in predetermined proportions, and other additives are further added, as desired, and mixed to form a homogeneous solution; a method in which at least a portion of at least two components of the components (a) to (c), for example, is mixed to form a homogeneous solution, after which the other components are added, and other additives are further added, as desired, and mixed to form a homogeneous solution; or a method in which a conventional solvent is used in addition to these components.

When a solvent is used, the solids content in the polymerizable composition of the present invention is not particularly limited as long as the components are homogeneously dissolved in the solvent; for example, the solids content is 1 to 50% by mass, 1 to 30% by mass, or 1 to 25% by mass. The "solids content" as used herein refers to the content of matter from which the solvent component is excluded from all components of the polymerizable composition.

The solution of the polymerizable composition is preferably used after being filtered through a filter with a pore size of 0.1 to 5 μm, for example.

<<Cured Product>>

According to the present invention, a cured product can be obtained by exposing the polymerizable composition to light (photocuring) or heating the polymerizable composition (thermal curing).

Examples of exposure light beams include ultraviolet light, electron beam, and X-ray. Examples of light sources that can be used for UV irradiation include sunlight, a chemical lamp, a low-pressure mercury lamp, a high-pressure mercury lamp, a metal halide lamp, a xenon lamp, and UV-LED. After the exposure, post-exposure bake may be applied to stabilize the physical properties of the cured product. The method of post-exposure bake is not particularly limited; typically, post-exposure bake is performed with, for example, a hot plate or an oven at 50 to 260° C. for 1 to 120 minutes.

The heating conditions for thermal curing are typically selected, as appropriate, from 50 to 300° C. and 1 to 120 minutes, although not particularly limited thereto. Examples of heating means include a hot plate and an oven, although not particularly limited thereto.

The cured product obtained by curing the polymerizable composition of the present invention has a high refractive index, i.e., 1.62 or more, at a wavelength of 589 nm. Moreover, the cured product is restrained from cracking or peeling from a support due to heating, and has dimensional stability. The cured product, therefore, can be suitably used as a high-refractive-index resin lens material.

<<Molded Article>>

Various molded articles can be readily produced in parallel with the formation of the cured product, by applying conventional molding processes such as, for example, compression molding (imprinting or the like), casting, injection molding, and blow molding to the polymerizable composition of the present invention. Molded articles thus obtained are also provided by the present invention.

Preferred as a method for producing such a molded article is, for example, a method for producing a molded article comprising the steps of:

charging the above-described polymerizable composition of the present invention into a space between a support and a mold that are in contact with each other or an inside space of a dividable mold;

photopolymerizing the charged composition by exposure;

releasing the resulting photopolymerization product from the charged space; and heating the photopolymerization product before, during, or after the release.

In the step of charging the polymerizable composition, a mold may be placed on a support such as a glass substrate, and then the polymerizable composition of the present invention may be charged into a space between the support and the mold; alternatively, the polymerizable composition may be charged into an inside space of a mold that is dividable into two or three mold sections, for example.

The step of photopolymerization by exposure can be performed by applying the conditions described in <<Cured Product>> above.

In the heating step, the photopolymerization product may be heated before or after the release step, or during the release, i.e., the photopolymerization product may be heated simultaneously with the release operation. Alternatively, the photopolymerization product may be heated from before the release to after the release. For example, the photopolymerization product may be released from the charged space between the support and the mold, and then heated on the support; alternatively, the photopolymerization product charged into the inside space of the dividable mold may be heated without being released from the inside space.

The conditions for the heating step are typically selected, as appropriate, from 50 to 260° C. and 1 to 120 minutes, although not particularly limited thereto. Examples of heating means include a hot plate and an oven, although not particularly limited thereto.

The molded article produced by this method can be suitably used as a camera module lens.

EXAMPLES

The present invention will be hereinafter described in more detail with reference to examples; however, the present invention is not limited to the following examples.

In the Examples, the apparatuses and conditions used for the preparation of samples and analysis of physical properties thereof are as follows:

(1) Gel Permeation Chromatography (GPC)

Apparatus: Prominence (registered trademark) GPC system from Shimadzu Corporation Column: Shodex (registered trademark) GPC KF-804L and GPC KF-803L from Showa Denko K.K.

Column temperature: 40° C.

Solvent: tetrahydrofuran

Detector: RI

Calibration curve: standard polystyrene (2) Gas Chromatography (GC)

Apparatus: GC-2010 from Shimadzu Corporation

Column: TC-17 (inside diameter: 0.25 mm, film thickness: 0.25 μm, length: 30 m) from GL Sciences Inc.

Column temperature: 40° C. (5 min)-5° C./min-120° C.-30° C./min-250° C. (5 min)

Detector: FID

Carrier gas: nitrogen (total flow rate: 68.3 mL/min)

(3) Stirring and Defoaming Machine

Apparatus: planetary centrifugal mixer, THINKY MIXER AWATORI RENTARO (registered trademark) ARE-310 from THINKY CORPORATION (4) UV Exposure Apparatus: batch-process UV irradiator (high-pressure mercury lamp, 2 kW×one lamp) from EYE GRAPHICS CO., LTD.

(5) Refractive Index $n_D$ and Abbe's Number $\nu_D$

Apparatus: multiwavelength Abbe refractometer DR-M4 from ATAGO CO., LTD.

Measurement temperature: 20° C.

(6) Glass Transition Temperature Tg
Apparatus: dynamic viscoelasticity-measuring apparatus (DMA) Q800 from TA Instruments
Deformation mode: tensile
Frequency: 1 Hz
Strain: 0.1%
Sweep temperature: 25 to 250° C.
Heating rate: 10° C./min
(7) Nanoimprinter
Apparatus: NM-0801HB from Meisyo Kiko Co., Ltd.
Pressing pressure: 150 N
UV exposure dose: 20 mW/cm$^2$, 150 seconds
(8) Reflow Oven
Apparatus: table-top reflow oven STR-3100 from SHINAPEX CO., LTD.
(9) Lens Height
Apparatus: contactless surface texture-measuring apparatus PF-60 from Mitaka Kohki Co., Ltd.
(10) $^1$H NMR spectrum
Apparatus: AVANCE III HD from Bruker Corporation
Measurement frequency: 500 MHz
Solvent: CDCl$_3$
Internal standard: tetramethylsilane (δ 0.00 ppm)
The abbreviations represent the following meanings:
BnA: benzyl acrylate [Viscoat#160 from Osaka Organic Chemical Industry Ltd.]
DVB: divinylbenzene [DVB-810 from Nippon Steel & Sumikin Chemical Co., Ltd.]
FDA: bisarylfluorene diacrylate [OGSOL (registered trademark) EA-F5503 from Osaka Gas Chemicals Co., Ltd.]
NTMS: trimethoxy(1-naphthyl)silane [1NAPS from Toray Fine Chemicals Co., Ltd.]
PheTMS: trimethoxy(9-phenanthryl)silane
PTMS: trimethoxy(phenyl)silane [from Shin-Etsu Chemical Co., Ltd.]
STMS: trimethoxy(4-vinylphenyl)silane [from Shin-Etsu Chemical Co., Ltd.]
TMOS: tetramethoxysilane [from Tokyo Chemical Industry Co., Ltd.]
DDT: n-dodecanethiol [THIOKALCOL 20 from Kao Corporation]
I1010: pentaerythritol tetrakis[3-(3,5-di-tert-butyl-4-hydroxyphenyl)propionate] [IRGANOX (registered trademark) 1010 from BASF Japan Ltd.]
I184: 1-hydroxycyclohexyl phenyl ketone [IRGACURE (registered trademark) 184 from BASF Japan Ltd.]
TPO: diphenyl(2,4,6-trimethylbenzoyl)phosphine oxide [IRGACURE (registered trademark) TPO from BASF Japan Ltd.]
THF: tetrahydrofuran

[Example 1] Production of Reactive Silsesquioxane Compound 1 (SN55) Solution

A 200-mL reaction flask equipped with a condenser was charged with 2.71 g (6.4 mmol) of a 35% by mass aqueous solution of tetraethylammonium hydroxide [Aldrich Co. LLC.], 8.87 g (482 mmol) of ion-exchanged water, and 91 g of THF, and the air in the flask was replaced with nitrogen using a nitrogen balloon. To this mixture, a mixture of 36.1 g (161 mmol) of STMS and 40.0 g (161 mmol) of NTMS was added dropwise at room temperature (approximately 23° C.) over 10 minutes, and the mixture was stirred for 16 hours at 40° C. Next, 7.6 g of a cation-exchange resin [Amberlyst (registered trademark) 15JWET from Dow Chemical Company] was added to this reaction mixture. The mixture was stirred for 1 hour, and then the reaction was stopped. The resulting mixture was cooled to room temperature (approximately 23° C.). Subsequently, the cation-exchange resin was filtered through a membrane filter with a pore size of 0.2 μm, and washed with 15 g of ethyl acetate. The filtrate and washings were combined to obtain a reactive silsesquioxane compound 1 (hereinafter sometimes abbreviated as SN55) solution.

The obtained compound had a weight average molecular weight Mw of 1,900 as measured by GPC relative to polystyrene, and had a degree of distribution Mw (weight average molecular weight)/Mn (number average molecular weight) of 1.3.

[Example 2] Production of Reactive Silsesquioxane Compound 2 (SP55) Solution

A 300-mL reaction flask equipped with a condenser was charged with 2.97 g (7.1 mmol) of a 35% by mass aqueous solution of tetraethylammonium hydroxide [Aldrich Co. LLC.], 9.54 g (530 mmol) of ion-exchanged water, and 90 g of THF, and the air in the flask was replaced with nitrogen using a nitrogen balloon. To this mixture, a mixture of 39.6 g (177 mmol) of STMS and 35.0 g (177 mmol) of PTMS was added dropwise, with stirring at 40° C., over 30 minutes, and the mixture was stirred for 3.5 hours. The resulting mixture was cooled to room temperature (approximately 23° C.). Next, 7.5 g of a cation-exchange resin [Amberlyst (registered trademark) 15JWET from Dow Chemical Company] previously washed with THF and 1.5 g of a filter aid [KC FLOCK W-100GK from Nippon Paper Industries Co., Ltd.] were added to the reaction mixture. The mixture was stirred for 2 hours, and then the reaction was stopped. Subsequently, the cation-exchange resin and the filter aid were filtered through a membrane filter with a pore size of 0.2 μm, and washed with 15 g of THF. The filtrate and washings were combined to obtain a reactive silsesquioxane compound 2 (hereinafter sometimes abbreviated as SP55) solution.

The obtained compound had a weight average molecular weight Mw of 4,000 as measured by GPC relative to polystyrene, and had a degree of distribution Mw/Mn of 1.8.

[Example 3] Production of Reactive Silsesquioxane Compound 1 (SN55)/DVB Solution To the SN55 solution obtained in Example 1, 17.1 g of DVB was added, and mixed homogeneously. Subsequently, the THF, ethyl acetate, remaining water, and other volatile matter were distilled off under reduced pressure using a rotary evaporator to obtain an SN55/DVB solution.

The obtained solution had an SN55 content of 85% by mass and a DVB content of 15% by mass as determined by GC quantitative analysis.

[Production Example 1] Production of Reactive Silsesquioxane Compound 1 (SN55)/BnA Solution The reactive silsesquioxane compound 1 solution was obtained in accordance with the method described in Example 1.

The obtained compound had a weight average molecular weight Mw of 2,100 as measured by GPC relative to polystyrene, and had a degree of distribution Mw/Mn of 1.3.

Next, 17.1 g of BnA was added to the obtained SN55 solution, and mixed homogeneously. Subsequently, the THF, ethyl acetate, remaining water, and other volatile matter were distilled off under reduced pressure using a rotary evaporator to obtain an SN55/BnA solution.

The obtained solution had an SN55 content of 75% by mass and a BnA content of 25% by mass as determined by GC quantitative analysis.

[Production Example 2] Production of Reactive Silsesquioxane Compound 2 (SP55)/BnA Solution To the SP55 solution obtained in Example 2, 9.3 g of BnA was added, and mixed homogeneously. Subsequently, the THF, remaining water, and other volatile matter were distilled off under reduced pressure using a rotary evaporator to obtain an SP55/BnA solution.

The obtained solution had an SP55 content of 75% by mass and a BnA content of 25% by mass as determined by GC quantitative analysis.

[Example 4] Preparation of Polymerizable Composition 1

The following components were mixed with stirring for 3 hours at 50° C.: 47.9 parts by mass of the SN55/DVB solution produced in Example 3 (SN55: 40.7 parts by mass, DVB: 7.2 parts by mass) as the reactive silsesquioxane compound (a); 42.7 parts by mass of FDA as the fluorene compound (b); 9.4 parts by mass of DVB (16.6 parts by mass together with the DVB contained in the above-mentioned SN55/DVB solution) as the aromatic vinyl compound (c); 0.5 part by mass of DDT as a chain transfer agent (reaction accelerator); 0.5 part by mass of I1010 as an antioxidant; and 2 parts by mass of I184 and 0.5 part by mass of TPO as polymerization initiators. The mixture was then defoamed with stirring for 10 minutes to prepare a polymerizable composition 1.

[Examples 5 and 6] Preparation of Polymerizable Compositions 2 and 3

Polymerizable compositions 2 and 3 were prepared as in Example 4, except that each of the compositions was changed as shown in Table 1. In Table 1, "part(s)" denotes "part(s) by mass".

[Comparative Example 1] Preparation of Polymerizable Composition 4

The following components were mixed with stirring for 3 hours at 50° C.: 54.3 parts by mass of the SN55/BnA solution produced in Production Example 1 (SN55: 40.7 parts by mass, BnA: 13.6 parts by mass) as the reactive silsesquioxane compound (a); 42.7 parts by mass of FDA as the fluorene compound (b); 3.0 parts by mass of BnA (16.6 parts by mass together with the BnA contained in the above-mentioned SN55/BnA solution) instead of the aromatic vinyl compound (c); 0.5 part by mass of DDT as a chain transfer agent (reaction accelerator); 0.5 part by mass of I1010 as an antioxidant; and 2 parts by mass of I184 and 0.5 part by mass of TPO as polymerization initiators. The mixture was then defoamed with stirring for 10 minutes to prepare a polymerizable composition 4.

[Comparative Example 2] Preparation of Polymerizable Composition 5

A polymerizable composition 5 was prepared as in Comparative Example 1, except that the SP55/BnA solution produced in Production Example 2 was used as the reactive silsesquioxane compound (a).

TABLE 1

| Example/Comparative Example | Polymerizable Composition | (a) Silsesquioxane | [Part(s)] | (b) FDA [Part(s)] | (c) Aromatic Vinyl or the Like | [Part(s)] | DDT [Part(s)] | I1010 [Part(s)] | I184 [Part(s)] | TPO [Part(s)] |
|---|---|---|---|---|---|---|---|---|---|---|
| Example 4 | Polymerizable Composition 1 | SN55 | 40.7 | 42.7 | DVB | 16.6 | 0.5 | 0.5 | 2.0 | 0.5 |
| Example 5 | Polymerizable Composition 2 | SN55 | 40.7 | 49.3 | DVB | 10.0 | 2.0 | 0.5 | 2.0 | 0.5 |
| Example 6 | Polymerizable Composition 3 | SN55 | 40.7 | 52.3 | DVB | 7.0 | 2.0 | 0.5 | 2.0 | 0.5 |
| Comparative Example 1 | Polymerizable Composition 4 | SN55 | 40.7 | 42.7 | BnA | 16.6 | 0.5 | 0.5 | 2.0 | 0.5 |
| Comparative Example 2 | Polymerizable Composition 5 | SP55 | 40.7 | 42.7 | BnA | 16.6 | 0.5 | 0.5 | 2.0 | 0.5 |

[Evaluation 1 of Optical Characteristics of Cured Products]

Each polymerizable composition, together with an 800-μm-thick silicone rubber spacer, was sandwiched between two release-treated glass substrates. The sandwiched polymerizable composition was exposed to UV light at 20 mW/cm$^2$ for 150 seconds, and then heated in an oven at 150° C. for 15 minutes. The polymerizable composition was cooled to room temperature (approximately 23° C.), and then the cured product was removed from the glass substrates to produce a specimen with a diameter of 30 mm and a thickness of 800 μm.

The resulting specimen was measured for refractive index $n_D$ at a D ray (wavelength: 589 nm) and Abbe's number $v_D$ at a D ray (wavelength: 589 nm). The results are shown in Table 2.

[Evaluation of Physical Properties of Cured Products]

Each polymerizable composition was poured into a 200-μm-thick silicone mold having a central portion cut out in the form of a 30 mm×7 mm rectangle placed on a release-treated glass substrate, and another release-treated glass substrate was placed thereon from above. The polymerizable composition within the mold sandwiched between the two glass substrates was exposed to UV light at 20 mW/cm$^2$ for 150 seconds, and then heated in an oven at 150° C. for 15 minutes. The polymerizable composition was cooled to room temperature (approximately 23° C.), and then the cured product was removed from the glass substrates to produce a specimen with a length of 30 mm, a width of 7 mm, and a thickness of 200 μm.

The obtained specimen was evaluated for glass transition temperature Tg. To evaluate Tg, storage modulus E' and loss modulus E" were measured using the DMA, and the temperature at which tan δ (loss modulus E"/storage modulus E') obtained therefrom showed a maximum value was determined as Tg. If a peak of tan δ was not clearly observed, and the maximum value of tan δ was very small (0.25 or less), Tg was evaluated as "None". The results are also shown in Table 2.

TABLE 2

| Example/Comparative Example | Polymerizable Composition | Refractive Index $n_D$ | Abbe's number $v_D$ | tan δ Maximum Value | Tg [° C.] |
|---|---|---|---|---|---|
| Example 4 | Polymerizable Composition 1 | 1.620 | 25.1 | ≤0.25 | None |
| Example 5 | Polymerizable Composition 2 | 1.620 | 24.6 | ≤0.25 | None |
| Example 6 | Polymerizable Composition 3 | 1.620 | 25.4 | ≤0.25 | None |
| Comparative Example 1 | Polymerizable Composition 4 | 1.614 | 26.5 | 0.26 | 126 |
| Comparative Example 2 | Polymerizable Composition 5 | 1.591 | 28.9 | ≤0.25 | None |

As shown in Table 2, the cured products obtained from the polymerizable compositions of the present invention shown in Examples 4 to 6 were confirmed to exhibit high refractive indices of 1.62 or more and low Abbe's numbers of 26 or less. Furthermore, all these cured products did not have a clear Tg in the measured range of temperatures (25 to 250° C.), which confirmed that the cured products obtained from the polymerizable compositions of the present invention had very advantageous dimensional stability during heating (for example, in a solder reflow process at 260° C.).

In contrast, the cured products not containing an aromatic vinyl compound (Comparative Examples 1 and 2) had markedly low refractive indices. Furthermore, for the cured product of Comparative Example 1, a clear glass transition point was observed at 126° C., which confirmed that the cured product lacked dimensional stability during heating.

Examples 7 and 8

Using a nickel mold (twenty-five 2-mm-diameter lens molds arranged in five rows and five columns), each of the polymerizable compositions 1 and 2 was molded into a lens shape on a glass substrate serving as a support with a nanoimprinter. The mold used had been previously release-treated with Novec (registered trademark) 1720 [from 3M Corporation]. The glass substrate used had been previously subjected to an adhesion treatment with ShinEtsu Silicone (registered trademark) KBM-503 [from Shin-Etsu Chemical Co., Ltd.). After the mold was removed, the resulting product was heated in an oven at 150° C. for 20 minutes to produce convex lenses on the glass substrate.

The release properties during the removal of the mold in the above-described step were visually evaluated in accordance with the criteria shown below. The results are shown in Table 3.

For random five lenses of the obtained convex lenses on the glass substrate, the lens height (thickness) was measured before and after a heating test with a reflow oven, using the contactless surface texture-measuring apparatus, and the dimensional stability after heating was evaluated based on the change ratio (=(lens height before heating−lens height after heating)÷lens height before heating×100). Furthermore, the lenses after the heating test were inspected for cracks with a microscope supplied with the contactless surface texture-measuring apparatus. The heating test was performed as follows: for each polymerizable composition, the obtained convex lenses on the glass substrate were placed in a reflow oven, and three steps, i.e., 1) heating to 260° C. in 3 minutes, 2) maintaining at 260° C. for 20 seconds, and 3) allowing to cool to 50° C., were repeated three times. The results are also shown in Table 3.

<Criteria for Evaluating Release-Properties>

A: All lenses were cleanly released from the mold.
B: A portion of the lenses remained in the mold.
C: All lenses remained in the mold.

TABLE 3

| Example/Comparative Example | Polymerizable Composition | Release Properties | Cracks after Heating | Lens Height [μm] before Heating | Lens Height [μm] after Heating | Change Ratio [%] |
|---|---|---|---|---|---|---|
| Example 7 | Polymerizable Composition 1 | A | None | 482.9 | 481.1 | 0.37 |
| Example 8 | Polymerizable Composition 2 | A | None | 480.2 | 478.1 | 0.44 |

For use as camera module lenses, it is preferred that the lenses have a change ratio in lens height of less than ±1.0%, particularly less than ±0.5%, after the reflow process. As shown in Table 3, the cured products (convex lenses) obtained from the polymerizable compositions of the present invention (Examples 7 and 8) had small changes in lens height even after undergoing the reflow process at 260° C. three times, and had high dimensional stability. Furthermore, these cured products did not at all remain in the mold after molding (after UV curing) with a nanoimprinter, and had satisfactory release properties.

[Production Example 3] Production of Trimethoxy(9-phenanthryl)silane (PheTMS)

A 500-mL reaction flask equipped with a condenser was charged with 10.4 g (0.43 mol) of magnesium turnings [Kanto Chemical Co., Inc.], and the air in the flask was replaced with nitrogen using a nitrogen balloon. To this, a mixture of 100.3 g (0.39 mol) of 9-bromophenanthrene [Tokyo Chemical Industry Co., Ltd.] and 346 g of THF was added dropwise at room temperature (approximately 23° C.) over 1 hour, and the mixture was stirred for 30 minutes to prepare a Grignard reagent.

A 1-L reaction flask was charged with 178.0 g (1.17 mol) of TMOS and 346 g of THF, and the air in the flask was replaced with nitrogen using a nitrogen balloon. To this mixture, the Grignard reagent obtained above was added dropwise at room temperature (approximately 23° C.) over 30 minutes, and the mixture was stirred for 2 hours. From this reaction mixture, the THF was distilled off under reduced pressure using an evaporator. To the resulting residue was added 1,000 g of hexane to dissolve the soluble matter, and then the insoluble matter was filtered off. To the insoluble matter, 500 g of hexane was added again, and the insoluble matter was filtered off in the same manner. The filtrates were combined, and then the hexane was distilled off under reduced pressure using an evaporator to obtain a crude product. The crude product was distilled under reduced pressure (1 mmHg, 120 to 150° C.), and then recrystallized with 389 g of methanol to obtain 74.6 g of the target PheTMS (yield: 64%).

FIG. 1 shows the $^1$H NMR spectrum of the obtained compound.

[Example 9] Production of Reactive Silsesquioxane Compound 3 (SPe55)

A 200-mL reaction flask equipped with a condenser was charged with 2.40 g (5.7 mmol) of a 35% by mass aqueous solution of tetraethylammonium hydroxide [Aldrich Co. LLC.], 7.69 g (426 mmol) of ion-exchanged water, and 60 g of THF, and the air in the flask was replaced with nitrogen using a nitrogen balloon. To this mixture, a mixture of 31.9 g (142 mmol) of STMS and 42.5 g (142 mmol) of PheTMS produced in accordance with Production Example 3 was added dropwise at room temperature (approximately 23° C.) over 10 minutes, and the mixture was stirred for 4 hours at 40° C. The resulting mixture was cooled to room temperature (approximately 23° C.). Next, 7.4 g of a cation-exchange resin [Amberlyst (registered trademark) 15JWET from Dow Chemical Company] previously washed with THF and 1.5 g of a filter aid [KC FLOCK W-100GK from Nippon Paper Industries Co., Ltd.] were added to the reaction mixture. The mixture was stirred for 1 hour, and then the reaction was stopped. Subsequently, the cation-exchange resin and the filter aid were filtered through a membrane filter with a pore size of 0.5 μm, and washed with 75 g of ethyl acetate. The filtrate and washings were combined, and added to 2,300 g of methanol to precipitate the polymer. The precipitate was filtered off and dried to obtain 50.2 g of the target reactive silsesquioxane compound 3 (hereinafter sometimes abbreviated as SPe55).

The obtained compound had a weight average molecular weight Mw of 1,800 as measured by GPC relative to polystyrene, and had a degree of distribution Mw/Mn of 1.2.

[Example 10] Production of Reactive Silsesquioxane Compound 4 (SPe46)

A 200-mL reaction flask equipped with a condenser was charged with 0.235 g (0.56 mmol) of a 35% by mass aqueous solution of tetraethylammonium hydroxide [Aldrich Co. LLC.], 0.803 g (44.6 mmol) of ion-exchanged water, and 6 g of THF, and the air in the flask was replaced with nitrogen using a nitrogen balloon. To this mixture, a mixture of 2.51 g (11.2 mmol) of STMS and 5.00 g (16.8 mmol) of PheTMS produced in accordance with Production Example 3 was added dropwise at room temperature (approximately 23° C.) over 10 minutes, and the mixture was stirred for 4 hours at 40° C. The resulting mixture was cooled to room temperature (approximately 23° C.). Next, 0.75 g of a cation-exchange resin [Amberlyst (registered trademark) 15JWET from Dow Chemical Company] previously washed with THF and 0.15 g of a filter aid [KC FLOCK W-100GK from Nippon Paper Industries Co., Ltd.] were added to the reaction mixture. The mixture was stirred for 1 hour, and then the reaction was stopped. Subsequently, the cation-exchange resin and the filter aid were filtered through a membrane filter with a pore size of 0.5 μm, and washed with 7.5 g of ethyl acetate. The filtrate and washings were combined, and added to 225 g of methanol to precipitate the polymer. The precipitate was filtered off and dried to obtain 4.64 g of the target reactive silsesquioxane compound 4 (hereinafter sometimes abbreviated as SPe46).

The obtained compound had a weight average molecular weight Mw of 1,570 as measured by GPC relative to polystyrene, and had a degree of distribution Mw/Mn of 1.1.

[Example 11] Preparation of Polymerizable Composition 6

The following components were mixed with stirring for 3 hours at 50° C.: 45 parts by mass of SPe55 produced in Example 9 as the reactive silsesquioxane compound (a); 28 parts by mass of FDA as the fluorene compound (b); 12 parts by mass of DVB as the aromatic vinyl compound (c); 15 parts by mass of BnA as another polymerizable compound; 3 parts by mass of DDT as a chain transfer agent (reaction accelerator); 0.5 part by mass of I1010 as an antioxidant; and 2 parts by mass of I184 and 0.5 part by mass of TPO as polymerization initiators. The mixture was then defoamed with stirring for 10 minutes to prepare a polymerizable composition 6.

[Example 12] Preparation of Polymerizable Composition 7

A polymerizable composition 7 was prepared as in Example 11, except that the composition was changed as shown in Table 4. In Table 4, "part(s)" denotes "part(s) by mass".

TABLE 4

| Example | Polymerizable Composition | (a) Silsesquioxane [Part(s)] | (b) FDA [Part(s)] | (c) DVB [Part(s)] | BnA [Part(s)] | DDT [Part(s)] | I1010 [Part(s)] | I184 [Part(s)] | TPO [Part(s)] |
|---|---|---|---|---|---|---|---|---|---|
| Example 11 | Polymerizable Composition 6 | SPe55 45 | 28 | 12 | 15 | 3.0 | 0.5 | 2.0 | 0.5 |
| Example 12 | Polymerizable Composition 7 | SPe46 40 | 37 | 8 | 15 | 3.0 | 0.5 | 2.0 | 0.5 |

[Evaluation 2 of Optical Characteristics of Cured Products]

The polymerizable compositions 6 and 7 were evaluated in accordance with [Evaluation 1 of Optical Characteristics of Cured Products] above. The results are shown in Table 5.

TABLE 5

| Example/Comparative Example | Polymerizable Composition | Refractive Index $n_D$ | Abbe's number $v_D$ |
|---|---|---|---|
| Example 11 | Polymerizable Composition 6 | 1.627 | 23.2 |
| Example 12 | Polymerizable Composition 7 | 1.630 | 23.4 |

As shown in Table 5, the cured products obtained from the polymerizable compositions of the present invention shown in Examples 11 and 12 were confirmed to exhibit high refractive indices of 1.62 or more and low Abbe's numbers of 24 or less.

Examples 13 and 14

Convex lenses were prepared from the polymerizable compositions 6 and 7 and evaluated as in Example 7, except that the heating temperature in the oven after the release was changed to 180° C. The results are shown in Table 6.

TABLE 6

| Example/Comparative Example | Polymerizable Composition | Release Properties | Cracks after Heating | Lens Height [μm] before Heating | Lens Height [μm] after Heating | Change Ratio [%] |
|---|---|---|---|---|---|---|
| Example 13 | Polymerizable Composition 6 | A | None | 488.2 | 487.0 | 0.25 |
| Example 14 | Polymerizable Composition 7 | A | None | 482.6 | 481.4 | 0.25 |

As shown in Table 6, the cured products (convex lenses) obtained from the polymerizable compositions of the present invention (Examples 13 and 14) had smaller changes in lens height even after undergoing the reflow process at 260° C. three times, and had higher dimensional stability. Furthermore, these cured products did not at all remain in the mold after molding (after UV curing) with a nanoimprinter, and had satisfactory release properties.

The invention claimed is:

1. A polymerizable composition comprising:
   (a) 100 parts by mass of a reactive silsesquioxane compound, which is a polycondensate of an alkoxy silicon compound A of formula [1] and an alkoxy silicon compound B of formula [2]:

$$Ar^1—Si(OR^1)_3 \quad [1]$$

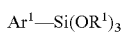
   wherein $Ar^1$ is a phenyl group having at least one group with a polymerizable double bond, a naphthyl group having at least one group with a polymerizable double bond, or a biphenyl group having at least one group with a polymerizable double bond; and $R^1$ is methyl group or ethyl group;

$$Ar^2—Si(OR^2)_3 \quad [2]$$

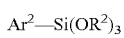
   wherein $Ar^2$ is a phenyl group optionally substituted with a $C_{1-6}$ alkyl group, a condensed polycyclic aromatic hydrocarbon group optionally substituted with a $C_{1-6}$ alkyl group, or a hydrocarbon ring assembly group optionally substituted with a $C_{1-6}$ alkyl group in which a plurality of aromatic rings are directly joined by a single bond; and $R^2$ is methyl group or ethyl group;

(b) 10 to 500 parts by mass of a fluorene compound of formula [3]:

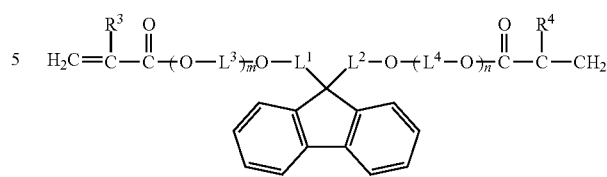

wherein $R^3$ and $R^4$ are each independently a hydrogen atom or methyl group; $L^1$ and $L^2$ are each independently a phenylene group optionally having a substituent or a naphthalenediyl group optionally having a substituent; $L^3$ and $L^4$ are each independently a $C_{1-6}$ alkylene group; and m and n are each zero or a positive integer such that m+n is 0 to 40; and (c) 1 to 100 parts by mass of an aromatic vinyl compound of formula [4]:

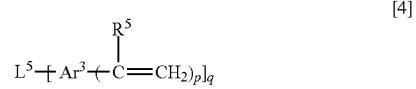

wherein $R^5$ is a hydrogen atom or methyl group; $L^5$ is a single bond, a hydrogen atom, an oxygen atom, a $C_{1-20}$ aliphatic hydrocarbon residue having a valence of q optionally substituted with phenyl group, or a $C_{1-20}$ aliphatic hydrocarbon residue having a valence of q optionally containing an ether bond; $Ar^3$ is an aromatic hydrocarbon residue having a valence of p+1; p's are each independently 1 or 2; and q is an integer from 1 to 3 with the proviso that q is 1 when $L^5$ is a hydrogen atom, and q is 2 when $L^5$ is a single bond or an oxygen atom.

2. The polymerizable composition according to claim 1, wherein $Ar^2$ is a condensed polycyclic aromatic hydrocarbon group optionally substituted with a $C_{1-6}$ alkyl group or a hydrocarbon ring assembly group optionally substituted with a $C_{1-6}$ alkyl group in which a plurality of aromatic rings are directly joined by a single bond.

3. The polymerizable composition according to claim 1, wherein the reactive silsesquioxane compound (a) is a polycondensate of a compound of formula [1a] and at least one compound selected from the group consisting of compounds of formulas [2a], [2b], and [2c]:

[1a]

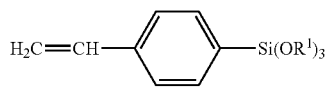

wherein R¹ has the same meaning as defined above;

[2a]

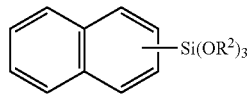

wherein R² has the same meaning as defined above;

[2b]

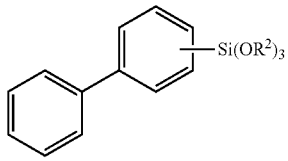

wherein R² has the same meaning as defined above;

[2c]

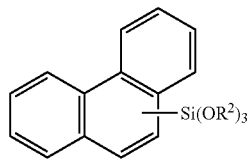

wherein R² has the same meaning as defined above.

4. The polymerizable composition according to claim 1, wherein L⁵ is a hydrogen atom, q is 1, and p is 2.

5. The polymerizable composition according to claim 1, wherein a cured product obtained from the composition has a refractive index of 1.62 or more and an Abbe's number of 26 or less.

6. A cured product obtained by curing the polymerizable composition according to claim 1.

7. A high-refractive-index resin lens material comprising the polymerizable composition according to claim 1.

8. A resin lens produced using the polymerizable composition according to claim 1.

9. A method for producing a molded article comprising the steps of:
charging the polymerizable composition according to claim 1 into a space between a support and a mold that are in contact with each other or an inside space of a dividable mold; and
photopolymerizing the charged composition by exposure.

10. The method for producing a molded article according to claim 9, further comprising the steps of:
releasing the resulting photopolymerization product from the charged space; and
heating the photopolymerization product before, during, or after the release.

11. The method for producing a molded article according to claim 9, wherein the molded article is a camera module lens.

12. A method for producing a reactive silsesquioxane compound wherein an alkoxy silicon compound A of formula [1] is polycondensed with an alkoxy silicon compound B of formula [2] in the presence of a base, and then the base is removed using a cation-exchange resin:

$$Ar^1\text{—}Si(OR^1)_3 \qquad [1]$$

wherein Ar¹ is a phenyl group having at least one group with a polymerizable double bond, a naphthyl group having at least one group with a polymerizable double bond, or a biphenyl group having at least one group with a polymerizable double bond; and R¹ is methyl group or ethyl group;

$$Ar^2\text{—}Si(OR^2)_3 \qquad [2]$$

wherein Ar² is a phenyl group optionally substituted with a $C_{1-6}$ alkyl group, a condensed polycyclic aromatic hydrocarbon group optionally substituted with a $C_{1-6}$ alkyl group, or a hydrocarbon ring assembly group optionally substituted with a $C_{1-6}$ alkyl group in which a plurality of aromatic rings are directly joined by a single bond; and R² is methyl group or ethyl group.

13. The method for producing a reactive silsesquioxane compound according to claim 12, wherein the cation-exchange resin is an ion-exchange resin having sulfo group as an ionic group.

\* \* \* \* \*